US010369985B2

(12) United States Patent
Yamamoto

(10) Patent No.: US 10,369,985 B2
(45) Date of Patent: Aug. 6, 2019

(54) CONTROL APPARATUS FOR HYBRID VEHICLE, HYBRID VEHICLE, AND CONTROL METHOD FOR HYBRID VEHICLE

(71) Applicant: TOYOTA JIDOSHA KABUSHIKI KAISHA, Toyota-shi, Aichi-ken (JP)

(72) Inventor: Masaya Yamamoto, Owariasahi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 221 days.

(21) Appl. No.: 15/450,253

(22) Filed: Mar. 6, 2017

(65) Prior Publication Data
US 2017/0259805 A1    Sep. 14, 2017

(30) Foreign Application Priority Data
Mar. 8, 2016    (JP) ................. 2016-044446

(51) Int. Cl.
*B60W 20/13*    (2016.01)
*B60L 58/12*    (2019.01)
(Continued)

(52) U.S. Cl.
CPC .............. *B60W 20/13* (2016.01); *B60K 6/26* (2013.01); *B60K 6/28* (2013.01); *B60K 6/365* (2013.01);
(Continued)

(58) Field of Classification Search
CPC .... B60W 20/13; B60W 50/082; B60W 10/26; B60W 10/08; B60W 30/1843;
(Continued)

(56) References Cited

U.S. PATENT DOCUMENTS 6,295,487 B1    9/2001    Ono et al.
2002/0058564 A1*    5/2002    Yamamoto ............... B60K 6/48
477/3
(Continued)

FOREIGN PATENT DOCUMENTS

CN    101454188 A    6/2009
EP    1 759 915 A2    3/2007
(Continued)

*Primary Examiner* — Frederick M Brushaber
(74) *Attorney, Agent, or Firm* — Finnegan, Henderson, Farabow, Garrett & Dunner, LLP

(57) ABSTRACT

An electronic control unit executes control such that a ratio of driving force output from a second motor in requested driving force when a hybrid vehicle travels in a charge depleting mode becomes larger than the ratio when the hybrid vehicle travels in a charge sustaining mode switched from the charge depleting mode by a mode selector switch. As a result, it becomes possible to suppress overheating of the second motor while cooling a first motor. When the mode selector switch is operated to select the charge depleting mode again, the second motor has already been cooled, so that performance of the second motor can sufficiently be demonstrated without a driving restriction due to overheating being imposed thereon. And, it becomes possible to suppress overheating of the second motor while achieving enhanced energy efficiency of the vehicle.

15 Claims, 5 Drawing Sheets

(51) Int. Cl.
*B60W 10/26* (2006.01)
*B60W 10/08* (2006.01)
*B60W 10/06* (2006.01)
*B60K 6/46* (2007.10)
*B60K 6/365* (2007.10)
*B60W 30/182* (2012.01)
*B60W 30/184* (2012.01)
*B60K 6/52* (2007.10)
*B60W 50/08* (2012.01)
*B60K 6/28* (2007.10)
*B60K 6/26* (2007.10)
*B60K 6/445* (2007.10)

(52) U.S. Cl.
CPC ............... *B60K 6/46* (2013.01); *B60K 6/52* (2013.01); *B60L 58/12* (2019.02); *B60W 10/06* (2013.01); *B60W 10/08* (2013.01); *B60W 10/26* (2013.01); *B60W 30/182* (2013.01); *B60W 30/1843* (2013.01); *B60W 50/082* (2013.01); *B60K 6/445* (2013.01); *B60L 2240/54* (2013.01); *B60L 2260/28* (2013.01); *B60W 2510/244* (2013.01); *B60W 2540/04* (2013.01); *B60W 2710/244* (2013.01); *B60W 2720/403* (2013.01); *Y02T 10/6239* (2013.01); *Y02T 10/6265* (2013.01); *Y02T 10/7258* (2013.01); *Y02T 10/84* (2013.01); *Y10S 903/906* (2013.01); *Y10S 903/907* (2013.01); *Y10S 903/91* (2013.01); *Y10S 903/93* (2013.01)

(58) Field of Classification Search
CPC .............. B60W 30/182; B60W 10/06; B60W 2540/04; B60W 2720/403; B60W 2710/244; B60W 2510/244; B60K 6/52; B60K 6/365; B60K 6/26; B60K 6/28; B60K 6/46; B60K 6/445; B60L 11/1861; B60L 2260/28; B60L 2240/54; Y02T 10/84; Y02T 10/6239; Y02T 10/7258; Y02T 10/6265; Y10S 903/91; Y10S 903/906; Y10S 903/907; Y10S 903/93
See application file for complete search history.

(56) References Cited

U.S. PATENT DOCUMENTS

| | | | |
|---|---|---|---|
| 2004/0104059 A1* | 6/2004 | Yamamoto | B60K 6/48 180/65.25 |
| 2009/0024262 A1 | 1/2009 | Amamiya | |
| 2009/0088914 A1 | 4/2009 | Mizutani et al. | |
| 2009/0250280 A1* | 10/2009 | Abe | B60K 6/26 180/65.285 |
| 2013/0297135 A1* | 11/2013 | Yamanaka | B60K 6/48 701/22 |
| 2013/0297136 A1* | 11/2013 | Yamanaka | B60K 6/48 701/22 |
| 2014/0229048 A1* | 8/2014 | Kawata | B60K 6/48 701/22 |
| 2015/0087476 A1* | 3/2015 | Dzafic | B60K 6/50 477/15 |
| 2016/0200310 A1* | 7/2016 | Amemiya | B60K 6/48 701/22 |
| 2017/0036664 A1* | 2/2017 | Yang | B60W 50/0098 |

FOREIGN PATENT DOCUMENTS

| | | |
|---|---|---|
| EP | 1 966 019 B1 | 4/2010 |
| JP | 2005-53317 | 3/2005 |
| JP | 2007-313982 A | 12/2007 |
| JP | 2010-143579 A | 7/2010 |
| JP | 2013-147206 A | 8/2013 |
| RU | 2381930 C2 | 2/2010 |

* cited by examiner

CONTROL APPARATUS FOR HYBRID VEHICLE, HYBRID VEHICLE, AND CONTROL METHOD FOR HYBRID VEHICLE

INCORPORATION BY REFERENCE

The disclosure of Japanese Patent Application No. 2016-044446 filed on Mar. 8, 2016 including the specification, drawings and abstract is incorporated herein by reference in its entirety.

BACKGROUND

1. Technical Field

The present disclosure relates to a control apparatus for a hybrid vehicle, the hybrid vehicle, and a control method for the hybrid vehicle. More specifically, the present disclosure relates to a control apparatus for a hybrid vehicle, the hybrid vehicle, and a control method for the hybrid vehicle including an engine, a first motor, and a second motor, the engine and the first motor being capable of outputting driving force to one pair of wheels out of a pair of front wheels and a pair of rear wheels, the second motor being capable of outputting driving force to the other pair of wheels out of the pair of front wheels and the pair of rear wheels.

2. Description of Related Art

As a hybrid vehicle, there has conventionally been proposed a vehicle including an engine, a first motor, and a second motor, the engine and the first motor being capable of outputting driving force to a pair of front wheels, the second motor being capable of outputting driving force to a pair of rear wheels (see, for example, Japanese Patent Application Publication No. 2005-53317). In the hybrid vehicle, a range of a front-wheel driving-force distribution ratio, which makes it possible to keep driving stability of the vehicle, is set first based on longitudinal acceleration. Next, a distribution ratio that minimizes the amount of fuel consumption per unit time (effective amount of fuel consumption of the engine) is set as the front-wheel driving-force distribution ratio, the amount of the fuel consumption per unit time being substantial consumption amount required for operating the engine and two motors in the aforementioned range. The vehicle travels with the driving force that is distributed at the set front-wheel driving-force distribution ratio. Thus, the driving force is distributed with the distribution ratio that minimizes the effective amount of fuel consumption of the engine so as to maintain driving stability of the vehicle while reducing amount of fuel consumption of the engine.

SUMMARY

As a four-wheel-drive hybrid vehicle, there has been proposed a vehicle configured to travel, in normal operation, with wheel drive in which driving force is output from the engine and the first motor to one of a pair of the front wheels and a pair of the rear wheels and to travel, when making a turn or suppressing a slip, with four-wheel drive in which part of a required driving force burden is distributed to the second motor that outputs driving force to the other pair out of the pair of front wheels and the pair of rear wheels. In such a hybrid vehicle that travels with part-time four-wheel drive, the second motor, which plays a subordinate role, often has a relatively small thermal capacity or has a cooling device with a relatively small cooling capacity attached thereto. If the hybrid vehicle of this type is made to travel as a four-wheel drive vehicle by constantly distributing the driving force burden to the second motor as described before to achieve enhanced energy efficiency, the second motor may be overheated.

The present disclosure provides a control apparatus for a hybrid vehicle, the hybrid vehicle, and a control method for the hybrid vehicle capable of preventing overheating of the second motor while enhancing energy efficiency of the vehicle.

A first aspect of the present disclosure is a control apparatus for a hybrid vehicle. The hybrid vehicle includes a pair of front wheels, a pair of rear wheels, an engine, a first motor, a second motor, a battery, and a mode selector switch, and an electronic control unit. The engine and the first motor are configured to output driving force to one pair of wheels out of the pair of front wheels and the pair of rear wheels. The second motor is configured to output driving force to the other pair of wheels out of the pair of front wheels and the pair of rear wheels. The battery is configured to supply electric power to the first motor and the second motor. The mode selector switch is configured to switch between a charge depleting mode and a charge sustaining mode. The electronic control unit is configured to control the engine, the first motor, and the second motor such that the hybrid vehicle travels with requested driving force requested for traveling of the hybrid vehicle. Furthermore, the electronic control unit is configured to execute control such that a first driving force ratio becomes larger than a second driving force ratio when the hybrid vehicle travels in the charge depleting mode. The first driving force ratio is a ratio of driving force output from the second motor in the requested driving force when the hybrid vehicle travels in the charge depleting mode the second driving force ratio is a ratio of driving force output from the second motor in the requested driving force when the hybrid vehicle travels in the charge sustaining mode switched from the charge depleting mode by the mode selector switch.

According to the configuration, when the hybrid vehicle travels in the charge depleting mode, the ratio of the driving force output from the second motor in the requested driving force requested for traveling is controlled to be larger than the ratio when the hybrid vehicle travels in the charge sustaining mode switched from the charge depleting mode by the mode selector switch. That is, when the hybrid vehicle travels in the charge sustaining mode switched by the mode selector switch, the ratio of the driving force output from the second motor in the requested driving force is made smaller than the ratio when the hybrid vehicle travels in the charge depleting mode. Accordingly, when the hybrid vehicle travels in the charge sustaining mode switched by the mode selector switch, the second motor can satisfactorily be cooled, which makes it possible to prevent the second motor from being overheated. When the hybrid vehicle travels in the charge depleting mode switched from the charge sustaining mode by the mode selector switch afterward, necessary driving force can be output from the second motor. At the time, a driving-force burden is distributed to the second motor so as to enhance energy efficiency, so that the energy efficiency of the vehicle can be enhanced. As a result, it becomes possible to suppress overheating of the second motor while achieving enhanced energy efficiency of the vehicle.

In the control apparatus, the electronic control unit may be configured to control the first motor and the second motor so as to minimize a loss of the first motor and the second motor when the hybrid vehicle travels in the charge depleting mode. According to the configuration, the energy efficiency of the vehicle can be enhanced. A loss of the first motor and the second motor being minimized means that a sum of the loss of the first motor and the loss of the second motor is minimized within the range where respective motors can be driven. For example, when a drive restriction is imposed on one of the first motor and the second motor due to overheating and the like, the above phrase means that the sum of the loss of the first motor and the loss of the second motor is minimized within the drive-restricted range.

In the control apparatus, the electronic control unit may be configured to control the first motor and the second motor with a first driving-force distribution ratio when the hybrid vehicle travels in the charge sustaining mode. The first driving-force distribution ratio may be a driving-force distribution ratio in accordance with travel performance requirements. Furthermore, the electronic control unit may be configured to control the first motor and the second motor with one driving-force distribution ratio selected out of the first driving-force distribution ratio and a second driving-force distribution ratio. The second driving-force distribution ratio may be a driving-force distribution ratio with which a loss of the first motor and the second motor is minimized when the hybrid vehicle travels in the charge depleting mode. According to the configuration, it becomes possible to satisfy the travel performance requirements and to minimize the loss at the same time. Here, the driving-force distribution ratio is a ratio of driving force distributed to the pair of rear wheels to the entire driving force. That is, when the driving-force distribution ratio takes a value zero, all the driving force is distributed to the pair of front wheels (100%), while no driving force is distributed to the pair of rear wheels (0%). When the driving-force distribution ratio takes a value one, no driving force is distributed to the pair of front wheels (0%), while all the driving force is distributed to the pair of rear wheels (100%).

In the control apparatus, the electronic control unit may be configured to execute control such that the second driving force ration becomes smaller than a third driving force ration when the hybrid vehicle travels in the charge sustaining mode switched from the charge depleting mode by the mode selector switch. The third driving force ration may be a ratio of driving force output from the second motor in the requested driving force when the hybrid vehicle travels in the charge sustaining mode switched from the charge depleting mode due to decrease in a state of charge of the battery. According to the configuration, when the hybrid vehicle travels in the charge sustaining mode switched by the mode selector switch, the second motor can be cooled further satisfactorily. Furthermore, when the hybrid vehicle travels in the charge depleting mode switched from the charge sustaining mode by the mode selector switch afterward, the performance of the second motor can sufficiently be demonstrated. As a result, it becomes possible to suppress overheating of the second motor while further enhancing energy efficiency of the vehicle.

In the control apparatus, the electronic control unit may be configured to execute control to output driving force from the second motor, only when the electronic control unit determines that four-wheel-drive traveling is required when the hybrid vehicle travels in the charge sustaining mode switched from the charge depleting mode by the mode selector switch. According to the configuration, when the hybrid vehicle travels in the charge sustaining mode switched by the mode selector switch, frequency of driving the second motor can be decreased, so that the second motor can be cooled more satisfactorily.

A second aspect of the present disclosure is a hybrid vehicle. The hybrid vehicle includes a pair of front wheels, a pair of rear wheels, an engine, a first motor, a second motor, a battery, a mode selector switch, and an electronic control unit. The engine and the first motor are configured to output driving force to one pair of wheels out of the pair of front wheels and the pair of rear wheels. The second motor is configured to output driving force to the other pair of wheels out of the pair of front wheels and the pair of rear wheels. The battery is configured to store electric power from the first motor and the second motor. The mode selector switch is configured to switch between a charge depleting mode and a charge sustaining mode. The electronic control unit is configured to control the engine, the first motor, and the second motor such that the hybrid vehicle travels with requested driving force requested for traveling of the hybrid vehicle. Furthermore, the electronic control unit is configured to execute control such that a first driving force ratio becomes larger than a second driving force ratio when the hybrid vehicle travels in the charge depleting mode. The first driving force ratio is a ratio of driving force output from the second motor in the requested driving force when the hybrid vehicle travels in the charge depleting mode. The second driving force ratio is a ratio of driving force output from the second motor in the requested driving force when the hybrid vehicle travels in the charge sustaining mode switched from the charge depleting mode by the mode selector switch.

According to the configuration, when the hybrid vehicle travels in the charge sustaining mode switched by the mode selector switch, the second motor can satisfactorily be cooled, which makes it possible to prevent the second motor from being overheated. When the hybrid vehicle travels in the charge depleting mode switched from the charge sustaining mode by the mode selector switch afterward, necessary driving force can be output from the second motor. At the time, a driving-force burden is distributed to the second motor so as to enhance energy efficiency, so that the energy efficiency of the vehicle can be enhanced. As a result, it becomes possible to suppress overheating of the second motor while achieving energy efficiency of the vehicle.

A third aspect of the present disclosure is a control method for a hybrid vehicle. The hybrid vehicle includes a pair of front wheels, a pair of rear wheels, an engine, a first motor, a second motor, a battery, a mode selector switch, and an electronic control unit. The engine and the first motor are configured to output driving force to one pair of wheels out of the pair of front wheels and the pair of rear wheels. The second motor is configured to output driving force to the other pair of wheels out of the pair of front wheels and the pair of rear wheels. The battery is configured to store electric power from the first motor and the second motor. The mode selector switch is configured to switch between a charge depleting mode and a charge sustaining mode. The control method includes: controlling the engine, the first motor, and the second motor such that the hybrid vehicle travels with requested driving force requested for traveling of the hybrid vehicle; and executing control such that a first driving force ratio becomes larger than a second driving force ratio when the hybrid vehicle travels in the charge depleting mode. The first driving force ratio is a ratio of driving force output from the second motor in the requested driving force when the hybrid vehicle travels in the charge depleting mode. The second driving force ratio is a ratio of driving force output from the second motor in the requested driving force when the hybrid vehicle travels in the charge sustaining mode switched from the charge depleting mode by the mode selector switch.

According to the configuration, when the hybrid vehicle travels in the charge sustaining mode switched by the mode selector switch, the second motor can satisfactorily be cooled, which makes it possible to prevent the second motor from being overheated. When the hybrid vehicle travels in the charge depleting mode switched from the charge sustaining mode by the mode selector switch afterward, necessary driving force can be output from the second motor. At the time, a driving-force burden is distributed to the second motor so as to enhance energy efficiency, so that the energy efficiency of the vehicle can be enhanced. As a result, it becomes possible to suppress overheating of the second motor while achieving enhanced energy efficiency of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Now, a mode for carrying out the present disclosure will be described in detail based on an embodiment.

Figure 1:
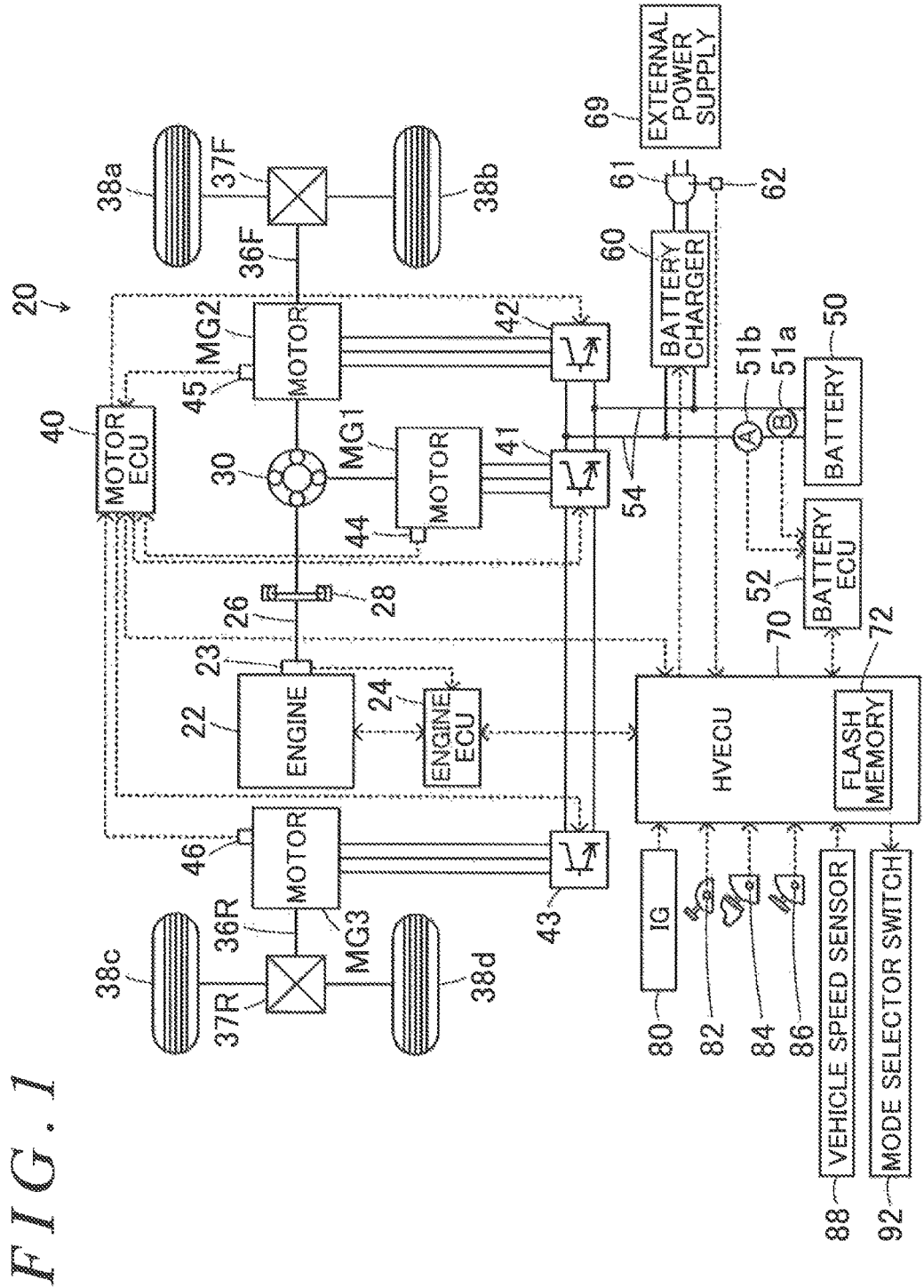
FIG. 1 is a block diagram illustrating an outlined configuration of a hybrid vehicle 20 as an embodiment of the present disclosure.

FIG. 1 is a block diagram illustrating an outlined configuration of a hybrid vehicle 20 as an embodiment of the present disclosure. As illustrated in the drawing, the hybrid vehicle 20 of the embodiment includes an engine 22, a planetary gear 30, motors MG1, MG2, MG3, inverters 41, 42, 43, a battery 50, a battery charger 60, and a hybrid electronic control unit (hereinafter referred to as HVECU) 70.

The engine 22 is configured as an internal combustion engine that outputs motive power by using fuel such as gasoline and gas oil from a fuel tank 25. The operation of the engine 22 is controlled by an engine electronic control unit (hereinafter referred to as engine ECU) 24.

Although not illustrated, the engine ECU 24 is configured as a microprocessor having a CPU as a main component. The engine ECU 24 includes, in addition to the CPU, a ROM that stores processing programs, a RAM that temporarily stores data, input and output ports, and a communication port. The engine ECU 24 receives input of signals from various sensors required for operation control of the engine 22. Examples of the signals input into the engine ECU 24 through the input port include a crank angle θcr from a crank position sensor 23 configured to detect a rotational position of a crankshaft 26 of the engine 22. The engine ECU 24 outputs various control signals for operation control of the engine 22 through the output port. The engine ECU 24 is connected with the HVECU 70 through the communication port. The engine ECU 24 calculates a speed Ne of the engine 22 based on the crank angle θcr from the crank position sensor 23.

The planetary gear 30 is configured as a single pinion-type planetary gear mechanism. The planetary gear 30 has a sun gear connected to a rotator of the motor MG1. The planetary gear 30 has a ring gear connected to a driving shaft 36F coupled with a pair of front wheels 38a, 38b through a differential gear 37F. The planetary gear 30 has a carrier connected to the crankshaft 26 of the engine 22 through a damper 28.

The motor MG1, which is configured as a synchronous generator-motor for example, has a rotator connected to the sun gear of the planetary gear 30 as stated before. The motor MG2, which is configured as a synchronous generator-motor for example, has a rotator connected to the driving shaft 36F. The motor MG3, which is configured as a synchronous generator-motor for example, has a rotator connected to a driving shaft 36R. The driving shaft 36R is coupled with a pair of rear wheels 38c, 38d through a differential gear 37R. The inverters 41, 42, 43 are connected with the battery 50 through an electric power line 54. The motors MG1, MG2, MG3, are rotationally driven when a motor electronic control unit (hereinafter referred to as a motor ECU) 40 performs switching control of a plurality of unillustrated switching elements of the inverters 41, 42, 43.

Although not illustrated, the motor ECU 40 is configured as a microprocessor having a CPU as a main component. The motor ECU 40 includes, in addition to the CPU, a ROM that stores processing programs, a RAM that temporarily stores data, input and output ports, and a communication port. The motor ECU 40 receives input of signals from various sensors required for controlling the operation of the motors MG1, MG2, MG3. Examples of the signals input into the motor ECU 40 through the input port include rotational positions θm1, θm2, θm3 from rotational position detection sensors 44, 45, 46 that detect rotational positions of the rotators of the motors MG1, MG2, MG3. The motor ECU 40 outputs, through the output port, signals such as a switching control signal to a plurality of unillustrated switching elements of the inverters 41, 42, 43. The motor ECU 40 is connected with the HVECU 70 through the communication port. The motor ECU 40 calculates the numbers of rotations Nm1, Nm2, Nm3 of the motors MG1, MG2, MG3, based on the rotational positions θm1, θm2, θm3 of the rotators of the motors MG1, MG2, MG3, from the rotational position detection sensors 44, 45, 46.

The battery 50 is configured, for example, as a lithium-ion secondary battery or a nickel-hydrogen secondary battery. The battery 50 is connected with the inverters 41, 42 through the electric power line 54 as stated before. The battery 50 is managed by a battery electronic control unit (hereinafter referred to as battery ECU) 52.

Although not illustrated, the battery ECU 52 is configured as a microprocessor having a CPU as a main component. The battery ECU 52 includes, in addition to the CPU, a ROM that stores processing programs, a RAM that temporarily stores data, input and output ports, and a communication port. The battery ECU 52 receives input of signals from various sensors required for managing the battery 50. Examples of the signals input into the battery ECU 52 through the input port include a battery voltage Vb from a voltage sensor 51a disposed between terminals of the battery 50, and a battery current Ib from a current sensor 51b attached to an output terminal of the battery 50. The battery ECU 52 is connected with the HVECU 70 through the communication port. The battery ECU 52 calculates a state of charge SOC based on an integrated value of the battery current Ib from the current sensor 51b. The state of charge SOC refers to a ratio of capacity of electric power dischargeable from the battery 50 to the total capacity of the battery 50.

The battery charger 60 is connected to the electric power line 54. The battery charger 60 is configured as a battery that can externally charge the battery 50 with electric power from an external power supply 69, such as a household power supply and an industrial power supply, when a power supply plug 61 of the battery charger 60 is connected to the external power supply 69 at a charging point such as a residence and a charging station.

Although not illustrated, the HVECU 70 is configured as a microprocessor having a CPU as a main component. The HVECU 70 includes, in addition to the CPU, a ROM that stores processing programs, a RAM that temporarily stores data, a flash memory 72, input and output ports, and a communication port. The HVECU 70 receives input of signals from various sensors through the input port. Examples of the signals input into the HVECU 70 include an ignition signal from an ignition switch 80, a shift position SP from a shift position sensor 82, an accelerator opening Ace from an accelerator pedal position sensor 84, and a brake pedal position BP from a brake pedal position sensor 86. The examples of the signals also include a vehicle speed V from a vehicle speed sensor 88, a switch signal from a mode selector switch 92, a connection signal from a connection switch 62 attached to the power supply plug 61 so as to determine whether or not the power supply plug 61 is connected to the external power supply 69. The HVECU 70 outputs various control signals such as a control signal to the battery charger 60 through the output port. As described before, the HVECU 70 is connected with the engine ECU 24, the motor ECU 40, and the battery ECU 52 through the communication port.

The hybrid vehicle 20 of the embodiment configured in this way performs hybrid traveling (hereinafter referred as HV traveling), or electric traveling (hereinafter referred to as EV traveling) in a Charge Depleting mode (hereinafter referred to as a CD mode) or a Charge Sustaining mode (hereinafter referred to as a CS mode). Here, the CD mode is a mode that prioritizes the EV traveling more than the CS mode. The HV traveling is a mode of traveling involving operation of the engine 22. The EV traveling is a mode of traveling without involving operation of the engine 22.

In the embodiment, the HVECU 70 controls the battery charger 60 such that the battery 50 is charged with electric power from the external power supply 69 when the power supply plug 61 is connected to the external power supply 69 while the vehicle is parked in a charging point such as a residence and a charging station with a system of the vehicle being turned off (the system being stopped). If the state of charge SOC of the battery 50 is larger than a threshold Shv1 (that takes a value such as 45%, 50%, and 55%) when the system is turned on (the system is started), the HVECU 70 controls the hybrid vehicle 20 to travel in the CD mode until the state of charge SOC of the battery 50 reaches a thresholds Shv2 (such as 25%, 30%, and 35%) or less. Once the state of charge SOC of the battery 50 reaches the threshold Shv2 or less, the HVECU 70 controls the hybrid vehicle 20 to travel in the CS mode until the system of the hybrid vehicle 20 is turned off. If the state of charge SOC of the battery 50 is equal to or less than the threshold Shv1 when the system is turned on, the HVECU 70 controls the hybrid vehicle 20 to travel in the CS mode until the system is turned off. When the mode selector switch 92 is operated while the hybrid vehicle 20 travels in the CD mode, the HVECU 70 controls the hybrid vehicle 20 to travel in the CS mode. When the mode selector switch 92 is operated again while the hybrid vehicle 20 travels in the CS mode selected by operation of the mode selector switch 92, the HVECU 70 controls the hybrid vehicle 20 to travel in the CD mode.

Normally, EV traveling is drive-controlled as follows. First, the HVECU 70 sets a request torque Tr* based on the accelerator opening Acc and the vehicle speed V. Next, the HVECU 70 sets a torque command Tm1* of the motor MG1 to a value zero, and sets torque commands Tm2*, Tm3* of the motors MG2, MG3 such that the request torque Tr* is output to the driving shafts 36F, 36R at a driving-force distribution ratio k within a range of an input-output restriction Win, Wout of the battery 50. The driving-force distribution ratio k is a ratio of distribution to the pair of rear wheels 38c, 38d in the embodiment. When k=0, all the driving force is distributed to the pair of front wheels 38a, 38b (100%), while no driving force is distributed to the pair of rear wheels 38c, 38d (0%). When k=1, no driving force is distributed to the pair of front wheels 38a, 38b (0%), while all the driving force is distributed to the pair of rear wheels 38c, 38d (100%). Upon reception of the torque commands Tm1*, Tm2*, Tm3*, the motor ECU 40 performs switching control of the switching elements of the inverters 41, 42, 43 such that the motors MG1, MG2, MG3, are driven with the torque commands Tm1*, Tm2*, Tm3*.

Normally, HV traveling is drive-controlled as follows. First, the HVECU 70 sets a request torque Tr* requested for traveling based on the accelerator opening Ace and the vehicle speed V. Next, the HVECU 70 calculates a travel power Pdrv* requested for traveling by multiplying the request torque Tr* by the number of rotations Nr of the driving shaft 36F. For example, the number of rotations Nr of the driving shaft 36F is the number of rotations obtained by multiplying the number of rotations Nm2 of the motor MG2 or the vehicle speed V by a scaling factor. Next, the HVECU 70 sets a request power Pe* requested for the vehicle, the request power Pe* being obtained by subtracting a charge-discharge request power Pb* (which takes a positive value at the time of discharging from the battery 50) of the battery 50 based on the state of charge SOC of the battery 50 from the travel power Pdrv*. When the request power Pe* is output from the engine 22, the HVECU 70 sets a target speed Ne* and a target torque Te* of the engine 22, and the torque commands Tm1*, Tm2*, Tm3* of the motors MG1, MG2, MG3. The HVECU 70 then transmits the set target speed Ne* and the target torque Te* of the engine 22, and the torque commands Tm1*, Tm2*, Tm3* of the motors MG1, MG2, MG3, to the engine ECU 24 and the motor ECU 40. The target speed Ne* and the target torque Te* of the engine 22, and the torque commands Tm1*, Tm2*, Tm3* of the motors MG1, MG2, MG3 are so set that the request torque Tr* is output to the driving shafts 36F, 36R within the range of the input-output restriction Win, Wout of the battery 50. The target speed Ne* and the target torque Te* of the engine 22 are set based on a fuel efficiency optimum operation line set for efficient output of the request power Pe* from the engine 22. The torque command Tm1* of the motor MG1 is set based on feedback control so that the engine 22 is operated at the target speed Ne* or the target torque Te*. The torque commands Tm2*, Tm3* of the motors MG2, MG3 are so set that the request torque Tr* is output to the driving shafts 36F, 36R at the driving-force distribution ratio k within the range of the input-output restriction Win, Wout of the battery 50. The engine ECU 24 that received the target speed Ne* and the target torque Te* performs control, such as intake air volume control, fuel injection control, and ignition control of the engine 22, such that the engine 22 is operated with the target speed Ne* and the target torque Te*. Upon reception of the torque commands Tm1*, Tm2*, Tm3*, the motor ECU 40 performs switching control of the switching elements of the inverters 41, 42, 43 such that the motors MG1, MG2, MG3, are driven with the torque commands Tm1*, Tm2*, Tm3*.

Figure 2:
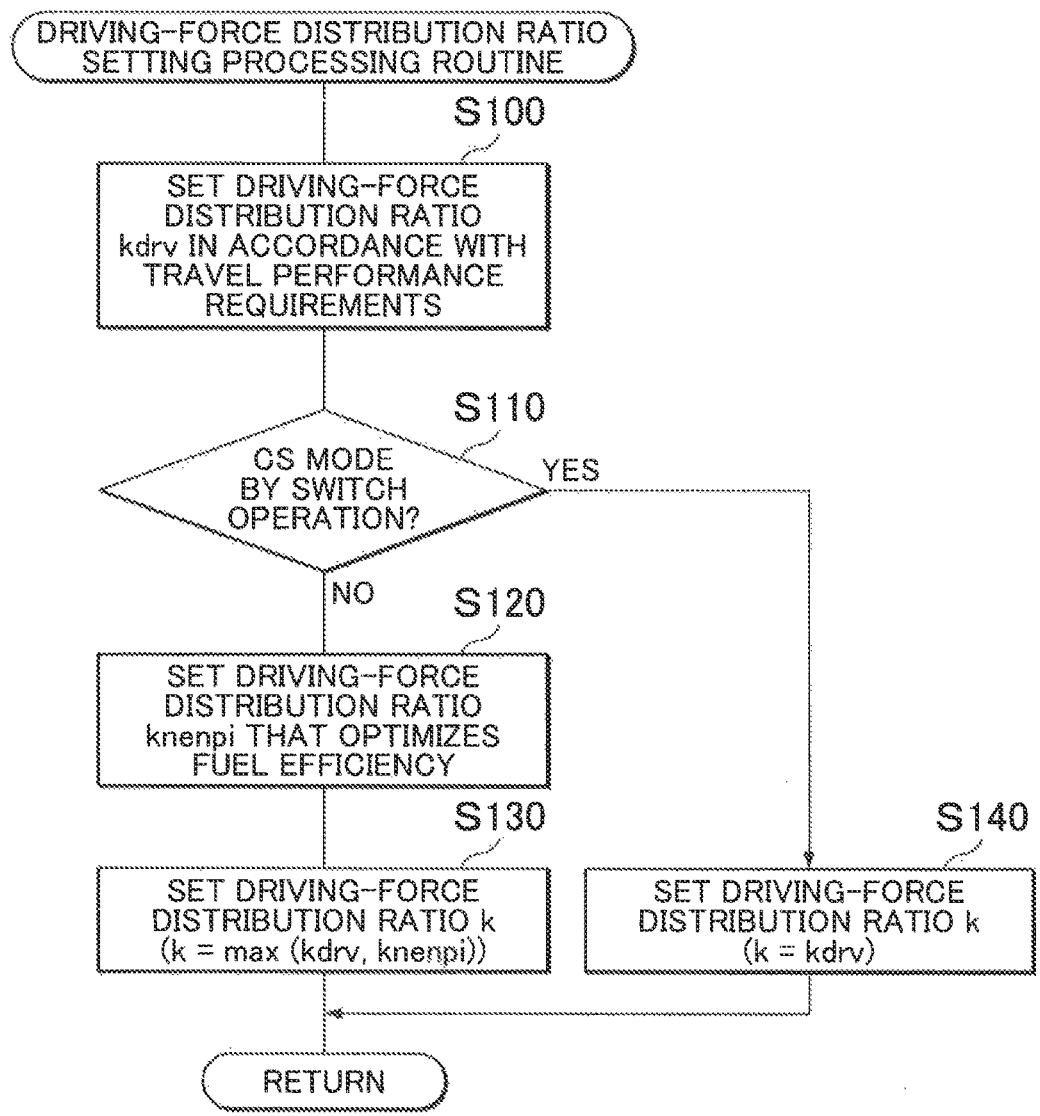
FIG. 2 is a flowchart illustrating one example of a driving-force distribution ratio setting processing routine executed by an HVECU 70.

A description is now given of operation of the thus-configured hybrid vehicle 20 of the embodiment. The description is particularly given of setting-operation of the driving-force distribution ratio k when the mode of the hybrid vehicle 20 is switched from the CD mode to the CS mode by operation of the mode selector switch 92 during traveling of the hybrid vehicle 20 and setting-operation of the driving-force distribution ratio k when the mode of the hybrid vehicle 20 is switched again to the CD mode by operation of the mode selector switch 92 during traveling of the hybrid vehicle 20. FIG. 2 is a flowchart illustrating one example of a driving-force distribution ratio setting processing routine executed by the HVECU 70. The routine is repeatedly executed every predetermined time (for example, several msecs or several dozen msecs).

Once the driving-force distribution ratio setting processing routine is executed, the HVECU 70 first sets a driving-force distribution ratio kdrv in accordance with travel performance requirements (step S100). In the embodiment, when it is determined that four-wheel driving is necessary based on a steering angle from an unillustrated steering angle sensor, the driving-force distribution ratio kdrv in accordance with the travel performance requirements is set to a value preset for steering. When it is determined that four-wheel driving is necessary due to slippery roads caused by snowfall and the like, the driving-force distribution ratio kdrv is set to a value preset for slip prevention. Furthermore, when it is determined that four-wheel driving is not necessary, the driving-force distribution ratio kdrv is set to a value zero.

Figure 3:
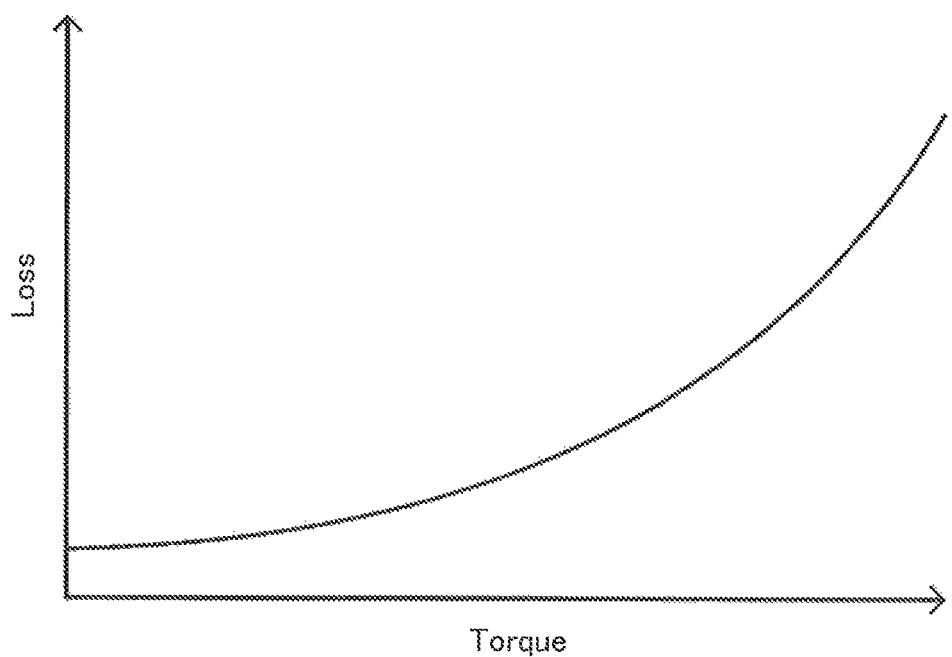
FIG. 3 is a characteristics chart illustrating one example of relation between motor output torque and motor loss.

Next, the HVECU 70 determines whether or not the mode selector switch 92 is operated to switch the CD mode to the CS mode (step S110). The HVECU 70 sets a driving-force distribution ratio knenpi that ensures optimum fuel efficiency, when the CD mode is not switched to the CS mode by operation of the mode selector switch 92 (step S120). The driving-force distribution ratio knenpi that ensures optimum fuel efficiency is set to minimize a sum of a loss of the motor MG2 and a loss of the motor MG3. FIG. 3 is a characteristics chart illustrating one example of relation between motor output torque and motor loss. Generally, the loss of the motor becomes larger, as the output torque is larger. Therefore, the optimum fuel efficiency is provided by distributing the torque to be output from the motor MG2 and the motor MG3 such that the sum of the loss of motor MG2 and the loss of motor MG3 is minimized. When driving of the motor MG2 or the motor MG3 is restricted due to overheating and the like, the driving-force distribution ratio knenpi is set to minimize the sum of the loss of the motor MG2 and the loss of the motor MG3 within the range of the driving restriction. Once the driving-force distribution ratio knenpi that optimizes fuel efficiency is set, the HVECU 70 sets the larger of the driving-force distribution ratio kdrv in accordance with the travel performance requirements and the driving-force distribution ratio knenpi that optimizes fuel efficiency as a driving-force distribution ratio k for execution (step S130), and ends the present routine. Thus, in setting the driving-force distribution ratio k, the driving-force distribution ratio knenpi that optimizes fuel efficiency is mainly set as the driving-force distribution ratio k. Accordingly, the energy efficiency of the vehicle can be enhanced.

On the contrary, when it is determined that the mode selector switch 92 is operated to switch the CD mode to the CS mode in step S110, the HVECU 70 sets the driving-force distribution ratio kdrv in accordance with the travel performance requirements as the driving-force distribution ratio k for execution (step S140), and ends the present routine. Thus, when the mode selector switch 92 is operated to switch the CD mode to the CS mode, the driving-force distribution ratio kdrv in accordance with the travel performance requirements is set as the driving-force distribution ratio k in order to suppress overheating of the motor MG3 or to promote cooling of the motor MG3. Generally, the motor MG2, which outputs motive power to the pair of front wheels 38a, 38b together with the engine 22, is constantly driven during traveling. Accordingly, the motor MG2 has a relatively large size and large thermal capacity, and also includes a cooling device with sufficient performance for suppression of overheating. In contrast, the motor MG3, which is driven for part-time operation, often has a relatively small size and small thermal capacity, and also includes a cooling device low in performance for suppression of overheating. Accordingly, if the motor MG3 is constantly driven, the motor MG3 tends to be overheated, which leads to driving restriction imposed on the motor MG3. However, in the embodiment, when the mode selector switch 92 is operated to switch the CD mode to the CS mode, the motor MG3 is driven only if it is determined that four-wheel driving is necessary. Accordingly, not only overheating of the motor MG3 can be suppressed, but also cooling of the motor MG3 can be conducted. Therefore, when the mode selector switch 92 is operated to switch the CS mode to the CD mode afterward, the performance of the motor MG3 can sufficiently be demonstrated.

Figure 4:
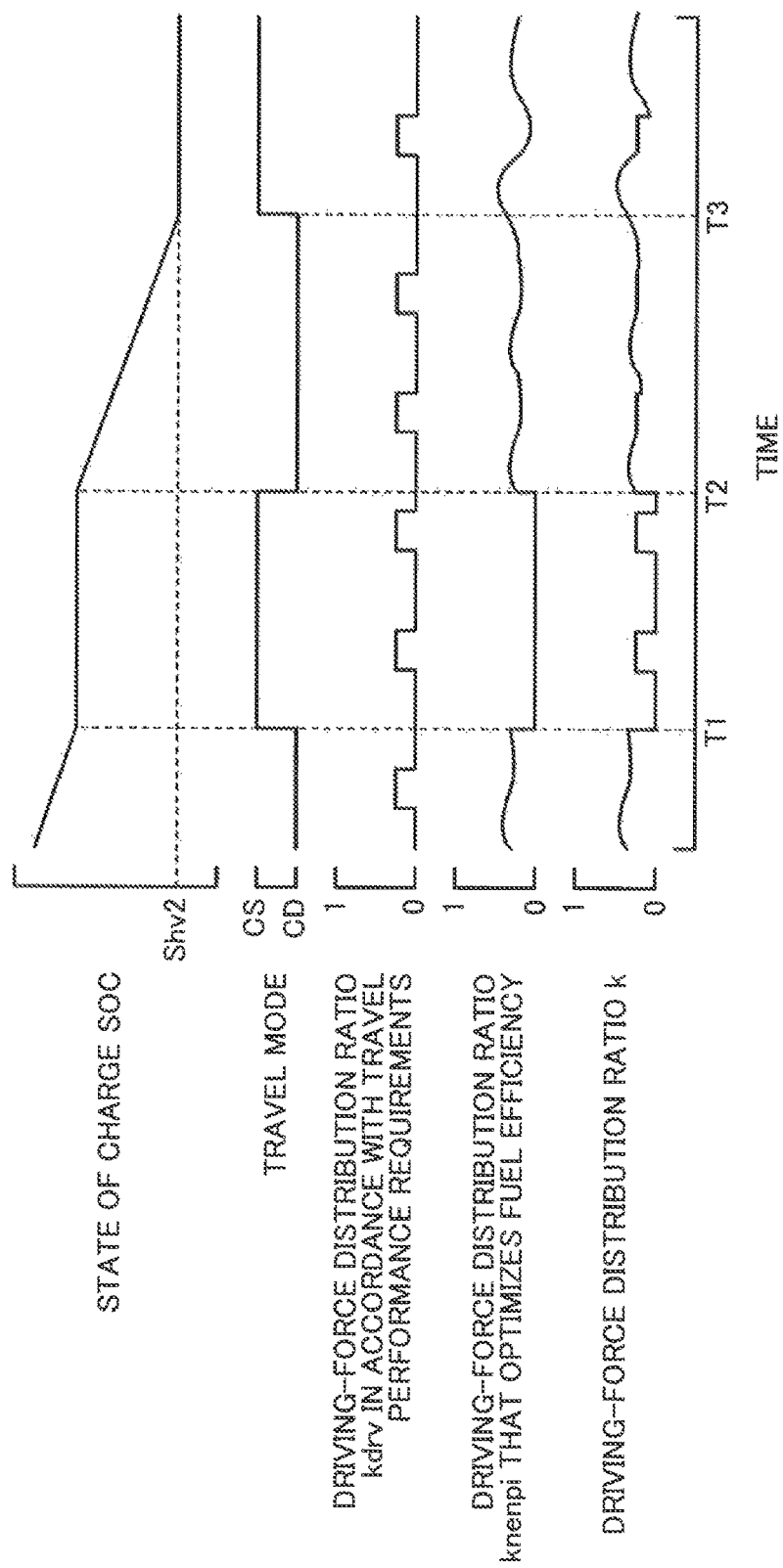
FIG. 4 is a time chart illustrating one example of temporal change in a state of charge SOC, a travel mode, and driving-force distribution ratios k.

FIG. 4 is a time chart illustrating one example of temporal change in the state of charge SOC, the travel mode, and the driving-force distribution ratios k. The vehicle travels in the CD mode until time T1. During the period, the state of charge SOC decreases with the passage of time, and the HVECU 70 sets the larger of the driving-force distribution ratio kdrv in accordance with the travel performance requirements and the driving-force distribution ratio knenpi that optimizes fuel efficiency as the driving-force distribution ratio k. At time T1, the mode selector switch 92 is operated to switch the travel mode from the CD mode to the CS mode. As a result, the state of charge SOC is kept unchanged irrespective of the passage of time, and the HVECU 70 sets the driving-force distribution ratio kdrv in accordance with the travel performance requirements as the driving-force distribution ratio k. That is, when the mode selector switch 92 is operated to switch the CD mode to the CS mode, the motor MG3 is driven only if it is determined that four-wheel driving is necessary. In the CS mode, a driving force ratio of the motor MG3 is made smaller than the driving force ratio in the CD mode. In other words, during traveling in the CD mode, the driving force ratio of the motor MG3 is made larger than the driving force ratio in the CS mode that is switched from the CD mode by operation of the mode selector switch 92. Accordingly, when the mode selector switch 92 is operated to switch the CD mode to the CS mode, drive frequency of the motor MG3 decreases, which makes it possible to cool the motor MG3. Then, when the mode selector switch 92 is operated again to switch the travel mode from the CS mode to the CD mode, the state of charge SOC decreases with the passage of time, and the HVECU 70 sets the larger of the driving-force distribution ratio kdrv in accordance with the performance requirements and the driving-force distribution ratio knenpi that optimizes fuel efficiency as the driving-force distribution ratio k. Since the motor MG3 is sufficiently cooled at the time, the driving restriction due to overheating is not imposed, so that the motor MG3 can sufficiently demonstrate the performance. As a result, energy efficiency of the vehicle can be enhanced. At time T3 when the state of charge SOC reaches a threshold Shv2, the travel mode is switched from the CD mode to the CS mode due to decrease in the state of charge SOC. Consequently, the state of charge SOC is kept unchanged irrespective of the passage of time. The HVECU 70 sets the larger of the driving-force distribution ratio kdrv in accordance with the travel performance requirements and the driving-force distribution ratio knenpi that optimizes fuel efficiency as the driving-force distribution ratio k.

In the hybrid vehicle 20 of the embodiment described in the foregoing, when the vehicle travels in the CD mode, the larger of the driving-force distribution ratio kdrv in accordance with the travel performance requirements and the driving-force distribution ratio knenpi that optimizes fuel efficiency is set as the driving-force distribution ratio k. Accordingly, the energy efficiency of the vehicle can be enhanced. When the mode selector switch 92 is operated to switch the CD mode to the CS mode while the hybrid vehicle 20 of the embodiment travels in the CD mode, the driving-force distribution ratio kdrv in accordance with the travel performance requirements is set as the driving-force distribution ratio k. That is, when the mode selector switch 92 is operated to switch the CD mode to the CS mode, the motor MG3 is driven only if it is determined that four-wheel driving is necessary. In the CS mode, a driving force ratio of the motor MG3 is made smaller than the driving force ratio in the CD mode. As a result, it becomes possible to prevent the motor MG3 from being overheated and to cool the motor MG2. When the mode selector switch 92 is operated again in the hybrid vehicle 20 of the embodiment to switch the CS mode to the CD mode, the larger of the driving-force distribution ratio kdrv in accordance with the travel performance requirements and the driving-force distribution ratio knenpi that optimizes fuel efficiency is set as the driving-force distribution ratio k. Since the motor MG3 is cooled at the time, the driving restriction due to overheating is not imposed, so that the motor MG3 can sufficiently demonstrate the performance. As a result, energy efficiency of the vehicle can be enhanced. As a consequence, it becomes possible to suppress overheating of the motor MG3 while achieving enhanced energy efficiency of the vehicle.

In the hybrid vehicle 20 of the embodiment, when the travel mode is switched from the CD mode to the CS mode due to decrease in the state of charge SOC, the larger of the driving-force distribution ratio kdrv in accordance with the travel performance requirements and the driving-force distribution ratio knenpi that optimizes fuel efficiency is set as the driving-force distribution ratio k. However, the HVECU may set the driving-force distribution ratio kdrv in accordance with the travel performance requirements as the driving-force distribution ratio k as in the case where the mode selector switch 92 is operated to switch the CD mode to the CS mode.

In the hybrid vehicle 20 of the embodiment, when the mode selector switch 92 is operated to switch the CD mode to the CS mode during traveling in the CD mode, the driving-force distribution ratio kdrv in accordance with the travel performance requirements is set as the driving-force distribution ratio k. However, the driving-force distribution ratio k may be so set that the driving force ratio of the motor MG3 during traveling in the CD mode is larger than the ratio used when the mode selector switch 92 is operated to switch the CD mode to the CS mode during traveling in the CD mode. Accordingly, the HVECU may set a driving-force distribution ratio in accordance with other requirements, in addition to the driving-force distribution ratio kdrv in accordance with the travel performance requirements.

The hybrid vehicle 20 of the embodiment includes the battery charger 60 that charges the battery 50 with the power supply plug 61 being connected to the external power supply 69. However, the hybrid vehicle 20 may include a battery charger that charges the battery 50 by receiving electric power from the external power supply 69 in a non-contact manner.

The hybrid vehicle 20 of the embodiment is configured such that the engine 22, the motor MG1, and the motor MG2 are connected to the driving shaft 36F coupled with the front wheels 38a, 38b, and the motor MG3 is connected to the driving shaft 36R coupled with the rear wheels 38c, 38d. However, the hybrid vehicle 20 may be configured such that the engine 22, the motor MG1, and the motor MG2 are connected to the driving shaft coupled with the rear wheels, and the motor MG3 is connected to the driving shaft coupled with the front wheels.

Figure 5:
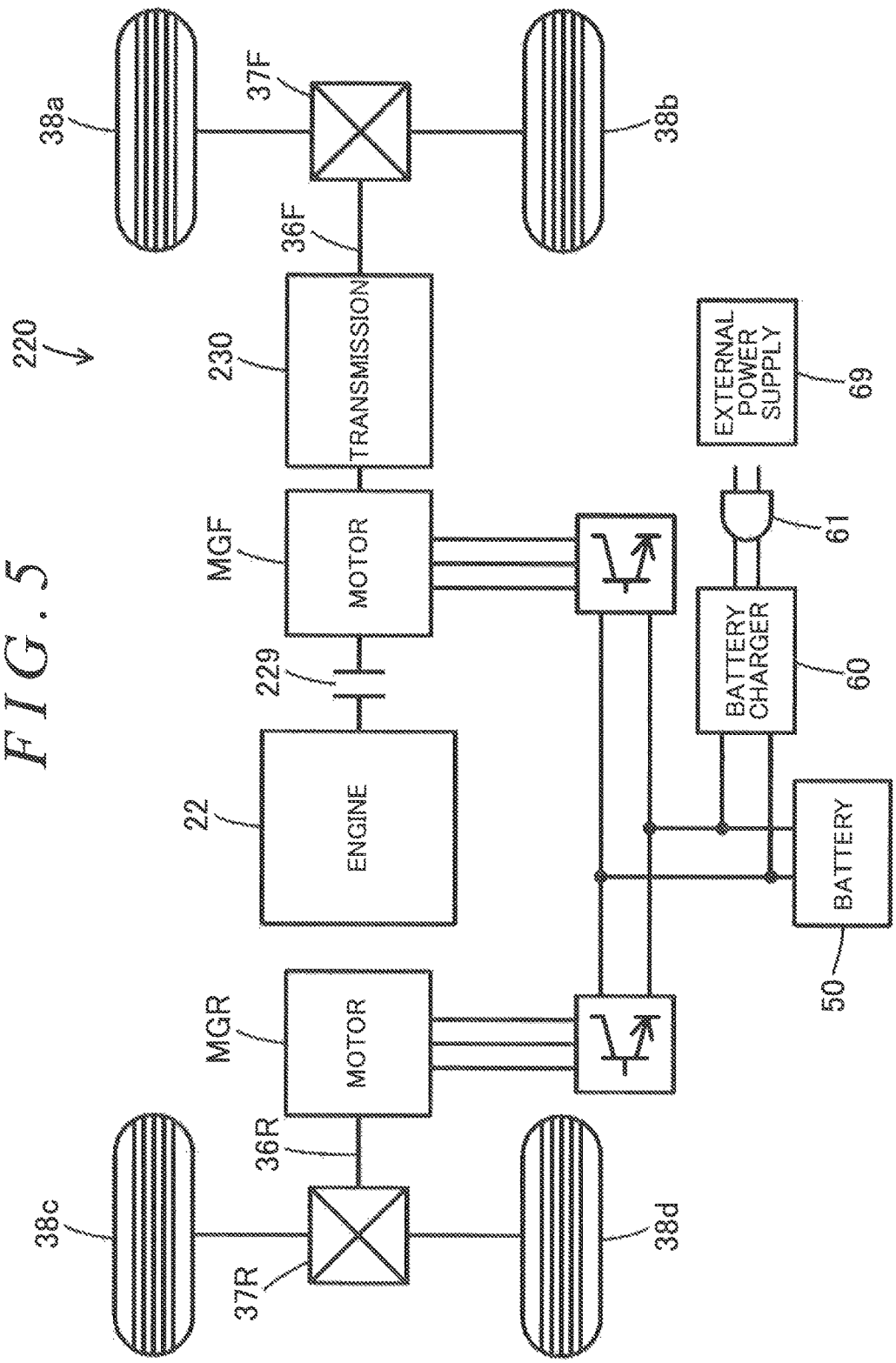
FIG. 5 is a block diagram illustrating an outlined configuration of a hybrid vehicle 220 of a modification.

The hybrid vehicle 20 of the embodiment is configured as a hybrid vehicle in which the engine 22, the motor MG1, and the driving shaft 36F coupled with the pair of front wheels 38a, 38b are connected to the planetary gear 30, the driving shaft 36F is connected to the motor MG2, and the driving shaft 36R coupled with the pair of rear wheels 38c, 38d is connected to the motor MG3. However, like a hybrid vehicle 220 of a modification illustrated in FIG. 5, the hybrid vehicle of the present disclosure may be configured such that a driving shaft 36F coupled with a pair of front wheels 38a, 38b is connected to a motor MGF through a transmission 230, a rotating shaft of the motor MGF is connected to an engine 22 through a clutch 229, and a driving shaft 36R coupled with a pair of rear wheels 38c, 38d is connected to a motor MGR. The hybrid vehicle may have any configuration as long as the hybrid vehicle includes an engine and a first motor that output driving force to one pair of wheels out of the pair of front wheels and the pair of rear wheels, and a second motor that can output driving force to other pair of wheels out of the pair of front wheels and the pair of rear wheels.

A description is given of correspondence relation between the main elements of the embodiment and the main elements of the present disclosure. In the embodiment, the engine 22 corresponds to the engine, the motor MG2 corresponds to the first motor, the motor MG3 corresponds to the second motor, the battery 50 corresponds to the battery, the HVECU 70, the engine ECU 24, and the motor ECU 40 correspond to the electronic control units, and the mode selector switch 92 corresponds to the mode selector switch.

Since the correspondence relation between the main elements of the embodiment and the main elements of the present disclosure is an example for specific description of the mode for carrying out the present disclosure described in Summary, the correspondence relation is not intended to limit the elements of the disclosure. That is, the embodiment is merely a specific example of the disclosure.

Although the mode for carrying out the present disclosure has been described using the embodiment, the present disclosure is not limited in any manner to the embodiment disclosed. It should naturally be understood that the present disclosure can be carried out in various modes without departing from the scope of the present disclosure.

The present disclosure is applicable in the fields such as manufacturing of the hybrid vehicle.

What is claimed is:

1. A control apparatus for a hybrid vehicle, the hybrid vehicle including
    a pair of front wheels,
    a pair of rear wheels,
    an engine and a first motor configured to output a first driving force to one pair of wheels out of the pair of front wheels and the pair of rear wheels,
    a second motor configured to output a second driving force to the other pair of wheels out of the pair of front wheels and the pair of rear wheels,
    a battery configured to supply electric power to the first motor and the second motor, and
    a mode selector switch configured to switch between a charge depleting mode and a charge sustaining mode,
the control apparatus comprising
    an electronic control unit configured to:
    control the engine, the first motor, and the second motor such that the hybrid vehicle travels with requested driving force requested for traveling of the hybrid vehicle; and
    execute control such that a first driving force ratio becomes larger than a second driving force ratio when the hybrid vehicle travels in the charge depleting mode, the first driving force ratio being a ratio of the second driving force to the requested driving force when the hybrid vehicle travels in the charge depleting mode, the second driving force ratio being a ratio of the second driving force to the requested driving force when the hybrid vehicle travels in the charge sustaining mode changed from the charge depleting mode by the mode selector switch.

2. The control apparatus according to claim 1, wherein the electronic control unit is configured to control the first motor and the second motor so as to minimize a loss of the first motor and the second motor when the hybrid vehicle travels in the charge depleting mode.

3. The control apparatus according to claim 1, wherein the electronic control unit is configured to:
    control the first motor and the second motor with a first driving-force distribution ratio when the hybrid vehicle travels in the charge sustaining mode, the first driving-force distribution ratio being a driving-force distribution ratio in accordance with travel performance requirements; and
    control the first motor and the second motor with one driving-force distribution ratio selected from the first driving-force distribution ratio and a second driving-force distribution ratio, the second driving-force distribution ratio being a driving-force distribution ratio with which a loss of the first motor and the second motor is minimized when the hybrid vehicle travels in the charge depleting mode.

4. The control apparatus according to claim 1, wherein the electronic control unit is configured to execute control such that the second driving force ratio becomes smaller than a third driving force ratio when the hybrid vehicle travels in the charge sustaining mode switched from the charge depleting mode by the mode selector switch, the third driving force ratio is a ratio of the second driving force to the requested driving force when the hybrid vehicle travels in the charge sustaining mode switched from the charge depleting mode due to decrease in a state of charge of the battery.

5. The control apparatus according to claim 1, wherein the electronic control unit is configured to execute control to output the second driving force from the second motor, only when the electronic control unit determines that four-wheel-drive traveling is required when the hybrid vehicle travels in the charge sustaining mode switched from the charge depleting mode by the mode selector switch.

6. A hybrid vehicle comprising:
    a pair of front wheels;
    a pair of rear wheels;
    an engine and a first motor configured to output a first driving force to one pair of wheels out of the pair of front wheels and the pair of rear wheels;
    a second motor configured to output a second driving force to the other pair of wheels out of the pair of front wheels and the pair of rear wheels;
    a battery configured to supply electric power to the first motor and the second motor; and
    a mode selector switch configured to switch between a charge depleting mode and a charge sustaining mode; and
    an electronic control unit configured to
    control the engine, the first motor, and the second motor such that the hybrid vehicle travels with requested driving force requested for traveling of the hybrid vehicle, and
    execute control such that a first driving force ratio becomes larger than a second driving force ratio when the hybrid vehicle travels in the charge depleting mode, the first driving force ratio being a ratio of the second driving force to the requested driving force when the hybrid vehicle travels in the charge depleting mode, the second driving force ratio being a ratio of the second driving force to the requested driving force when the hybrid vehicle travels in the charge sustaining mode switched from the charge depleting mode by the mode selector switch.

7. The hybrid vehicle according to claim 6, wherein the electronic control unit is configured to control the first motor and the second motor so as to minimize a loss of the first motor and the second motor when the hybrid vehicle travels in the charge depleting mode.

8. The hybrid vehicle according to claim 6, wherein the electronic control unit is configured to:
    control the first motor and the second motor with a first driving-force distribution ratio when the hybrid vehicle travels in the charge sustaining mode, the first driving-force distribution ratio being a driving-force distribution ratio in accordance with travel performance requirements; and
    control the first motor and the second motor with one driving-force distribution ratio selected from the first driving-force distribution ratio and a second driving-force distribution ratio, the second driving-force distribution ratio being a driving-force distribution ratio with which a loss of the first motor and the second motor is minimized when the hybrid vehicle travels in the charge depleting mode.

9. The hybrid vehicle according to claim 6, wherein the electronic control unit is configured to execute control such that the second driving force ratio becomes smaller than a third driving force ratio when the hybrid vehicle travels in the charge sustaining mode switched from the charge depleting mode by the mode selector switch, the third driving force ratio is a ratio of the second driving force to the requested driving force when the hybrid vehicle travels in the charge sustaining mode switched from the charge depleting mode due to decrease in a state of charge of the battery.

10. The hybrid vehicle according to claim 6, wherein
the electronic control unit is configured to execute control to output the second driving force from the second motor, only when the electronic control unit determines that four-wheel-drive traveling is required when the hybrid vehicle travels in the charge sustaining mode switched from the charge depleting mode by the mode selector switch.

11. A control method for a hybrid vehicle, the hybrid vehicle including
a pair of front wheels,
a pair of rear wheels,
an engine and a first motor configured to output a first driving force to one pair of wheels out of the pair of front wheels and the pair of rear wheels,
a second motor configured to output a second driving force to the other pair of wheels out of the pair of front wheels and the pair of rear wheels,
a battery configured to supply electric power to the first motor and the second motor, and
a mode selector switch configured to switch between a charge depleting mode and a charge sustaining mode, and
an electronic control unit,
the control method comprising:
controlling, by the electronic control unit, the engine, the first motor, and the second motor such that the hybrid vehicle travels with requested driving force requested for traveling of the hybrid vehicle; and
executing, by the electronic control unit, control such that a first driving force ratio becomes larger than a second driving force ratio when the hybrid vehicle travels in the charge depleting mode, the first driving force ratio being a ratio of the second driving force to the requested driving force when the hybrid vehicle travels in the charge depleting mode, the second driving force ratio being a ratio of the second driving force to the requested driving force when the hybrid vehicle travels in the charge sustaining mode switched from the charge depleting mode by the mode selector switch.

12. The control method according to claim 11, further comprising
controlling, by the electronic control unit, the first motor and the second motor so as to minimize a loss of the first motor and the second motor when the hybrid vehicle travels in the charge depleting mode.

13. The control method according to claim 11, further comprising:
controlling, by the electronic control unit, the first motor and the second motor with a first driving-force distribution ratio when the hybrid vehicle travels in the charge sustaining mode, the first driving-force distribution ratio being a driving-force distribution ratio in accordance with travel performance requirements; and
controlling, by the electronic control unit, the first motor and the second motor with one driving-force distribution ratio selected from the first driving-force distribution ratio and a second driving-force distribution ratio, the second driving-force distribution ratio being a driving-force distribution ratio with which a loss of the first motor and the second motor is minimized when the hybrid vehicle travels in the charge depleting mode.

14. The control method according to claim 11, further comprising
executing, by the electronic control unit, control such that the second driving force ratio becomes smaller than a third driving force ratio when the hybrid vehicle travels in the charge sustaining mode switched from the charge depleting mode by the mode selector switch, the third driving force ratio is a ratio of the second driving force to the requested driving force when the hybrid vehicle travels in the charge sustaining mode switched from the charge depleting mode due to decrease in a state of charge of the battery.

15. The control method according to claim 11, further comprising
executing, by the electronic control unit, control to output the second driving force from the second motor, only when the electronic control unit determines that four-wheel-drive traveling is required when the hybrid vehicle travels in the charge sustaining mode switched from the charge depleting mode by the mode selector switch.

* * * * *